(12) United States Patent
Cave et al.

(10) Patent No.: US 8,439,411 B2
(45) Date of Patent: May 14, 2013

(54) BUMPER BEAM WITH INTEGRATED ENERGY ABSORBER

(75) Inventors: Alan C. Cave, Mount Forest (CA);
Robert Dernovsek, Guelph (CA);
Richard W. Haveman, Newmarket (CA)

(73) Assignee: Magna International Inc., Aurora (CA)

( * ) Notice: Subject to any disclaimer, the term of this patent is extended or adjusted under 35 U.S.C. 154(b) by 109 days.

(21) Appl. No.: 13/066,134

(22) Filed: Apr. 7, 2011

(65) Prior Publication Data
US 2011/0254295 A1 Oct. 20, 2011

Related U.S. Application Data

(60) Provisional application No. 61/342,159, filed on Apr. 9, 2010.

(51) Int. Cl.
*B60R 19/38* (2006.01)
(52) U.S. Cl.
USPC .................. 293/132; 293/102; 293/120
(58) Field of Classification Search .......... 293/102, 293/120, 121, 132; 156/275.1
See application file for complete search history.

(56) References Cited

U.S. PATENT DOCUMENTS

| | | | |
|---|---|---|---|
| 5,139,297 A * | 8/1992 | Carpenter et al. ........... 293/132 |
| 6,106,039 A * | 8/2000 | Maki ............................ 293/132 |
| 6,663,150 B1 | 12/2003 | Evans |
| 6,672,635 B2 | 1/2004 | Weissenborn et al. |
| 6,874,832 B2 | 4/2005 | Evans et al. |
| 6,877,785 B2 | 4/2005 | Evans et al. |
| 6,908,127 B2 | 6/2005 | Evans |
| 6,926,323 B2 | 8/2005 | Evans |
| 6,971,690 B2 | 12/2005 | Evans et al. |
| 6,997,490 B2 | 2/2006 | Evans et al. |
| 7,052,056 B2 | 5/2006 | Weissenborn et al. |
| 7,073,831 B2 | 7/2006 | Evans |
| 7,127,227 B2 | 10/2006 | Takahiko |
| 7,131,674 B2 | 11/2006 | Evans et al. |
| 7,131,700 B2 | 11/2006 | Knoblock et al. |
| 7,144,054 B2 | 12/2006 | Evans |
| 7,147,258 B2 | 12/2006 | Evans et al. |
| 7,163,243 B2 | 1/2007 | Evans |
| 7,222,896 B2 | 5/2007 | Evans |
| 7,222,897 B2 | 5/2007 | Evans et al. |
| 7,228,723 B2 | 6/2007 | Evans et al. |
| 7,340,833 B2 | 3/2008 | Weissenborn et al. |
| 7,390,038 B2 | 6/2008 | Campbell et al. |
| 7,494,165 B2 | 2/2009 | Evans et al. |
| 7,552,955 B2 | 6/2009 | Evans |
| 2010/0109353 A1 * | 5/2010 | Allen et al. ................... 293/120 |
| 2011/0212331 A1 * | 9/2011 | Dyke et al. .................... 428/414 |

* cited by examiner

*Primary Examiner* — Lori Lyjak
(74) *Attorney, Agent, or Firm* — Warn Partners, P.C.

(57) ABSTRACT

The present invention is directed to an energy absorbing component externally mounted to a vehicle having a beam structural member and at least one energy absorber operably connected to the beam structural member. The energy absorber absorbs energy when the vehicle undergoes a collision. Also included is a beam cover plate connected to the beam structural member through the use of resistive implant welding, which simplifies the manufacturing process, and improves manufacturing costs. There are two vehicle attachment plates which are overmolded to the beam cover plate, the vehicle attachment plates allow for the beam cover plate to be attached to a vehicle. The beam cover plate, beam structural member, and energy absorber form a component that is operable to function as a bumper that is connected to a vehicle, which absorbs energy during a collision.

27 Claims, 5 Drawing Sheets

BUMPER BEAM WITH INTEGRATED ENERGY ABSORBER

CROSS-REFERENCE TO RELATED APPLICATIONS

This application claims priority to U.S. Provisional Application No. 61/342,159 filed on Apr. 9, 2010. The disclosure of the above application is incorporated herein by reference.

FIELD OF THE INVENTION

The present invention relates to an energy absorbing component for a bumper or fascia made of a composite material.

BACKGROUND OF THE INVENTION

Most motor vehicles in use today have some type of bumper or fascia mounted to the front end and rear end of the vehicle. Current designs for most bumpers have some sort of device or component which is used for absorbing energy during a collision. This reduces the amount of energy transferred to the occupants of the vehicle.

However, components used for absorbing energy during a collision of most current designs are made of metal, which is costly to manufacture. Accordingly, there exists a need for a bumper which includes a component able to absorb energy during a vehicle collision, with the component being made of a composite material.

SUMMARY OF THE INVENTION

The present invention is directed to an energy absorbing component externally mounted to a vehicle having a beam structural member and at least one energy absorber operably connected to the beam structural member. The energy absorber absorbs energy when the vehicle undergoes a collision.

Also included is a beam cover plate connected to the beam structural member through the use of resistive implant welding, which simplifies the manufacturing process, and improves manufacturing costs. There are two vehicle attachment plates which are overmolded to the beam cover plate, the vehicle attachment plates allow for the beam cover plate to be attached to a vehicle.

The beam structural member and the beam cover plate are made from injection molded long glass fiber nylon material, and the energy absorber is made from expanded polypropylene using a steam injection molding process.

The beam cover plate, beam structural member, and energy absorber form a component that is operable to function as a bumper that is connected to a vehicle, which absorbs energy during a collision.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
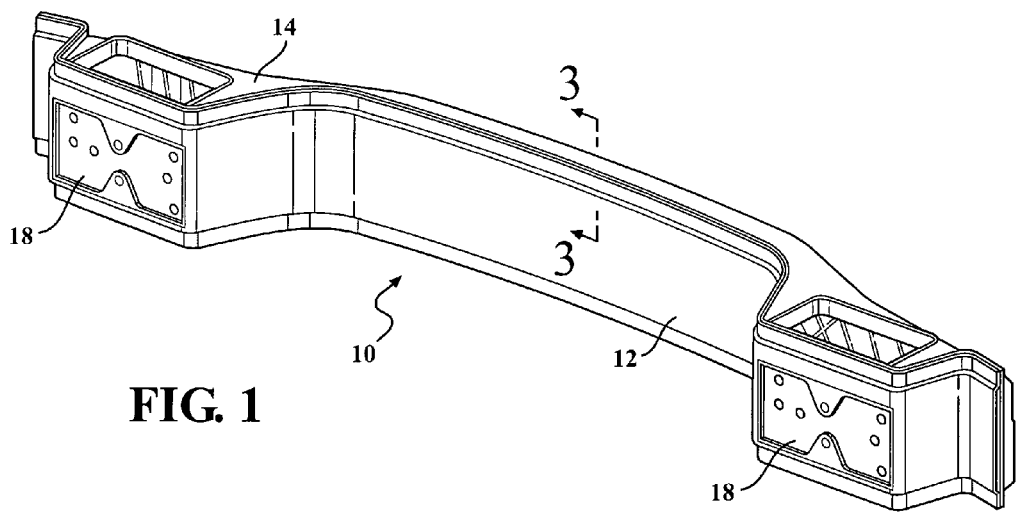
FIG. 1 is a first perspective view of a bumper beam having an integrated energy absorber, according to the present invention.
Figure 2:
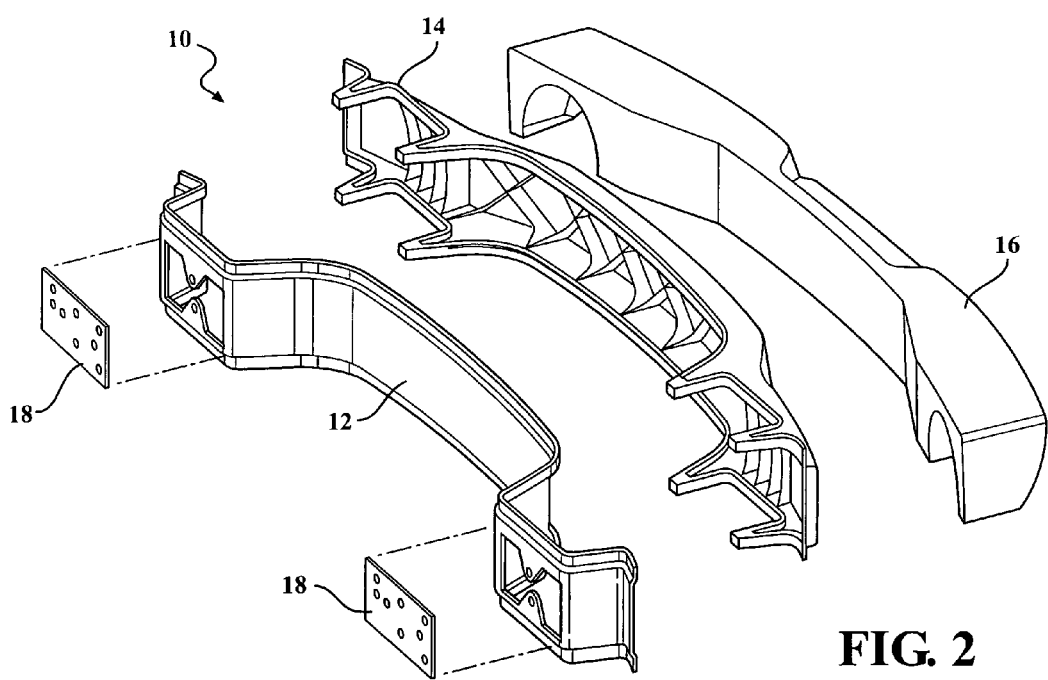
FIG. 2 is an exploded view of a bumper beam having an integrated energy absorber, according to the present invention

The following description of the preferred embodiment(s) is merely exemplary in nature and is in no way intended to limit the invention, its application, or uses.

A bumper beam having an integrated energy absorber is shown in the Figures generally at 10. The bumper beam 10 includes a beam cover plate 12, a beam structural member 14, and a foam energy absorber 16. The cover plate 12, beam structural member 14, and foam energy absorber 16 are all connected together, with the beam structural member 14 located between the cover plate 12 and the foam energy absorber 16.

Both the cover plate 12 and the beam structural member 14 are made of molded long glass fiber (LGF) nylon; they are connected by resistance implant welding (RIW). The foam energy absorber 16 is made from expanded polypropylene (EPP) material using a steam injection molding process, and is fastened to the beam structural member 14.

Also included is a plurality of vehicle attachment plates 18. In this embodiment, the attachment plates 18 are in the form of steel brackets 18, which are overmolded into the beam cover plate 12. The steel brackets 18 are made of 1008/1010 steel, and are suitable for connection with a vehicle.

Figure 7:
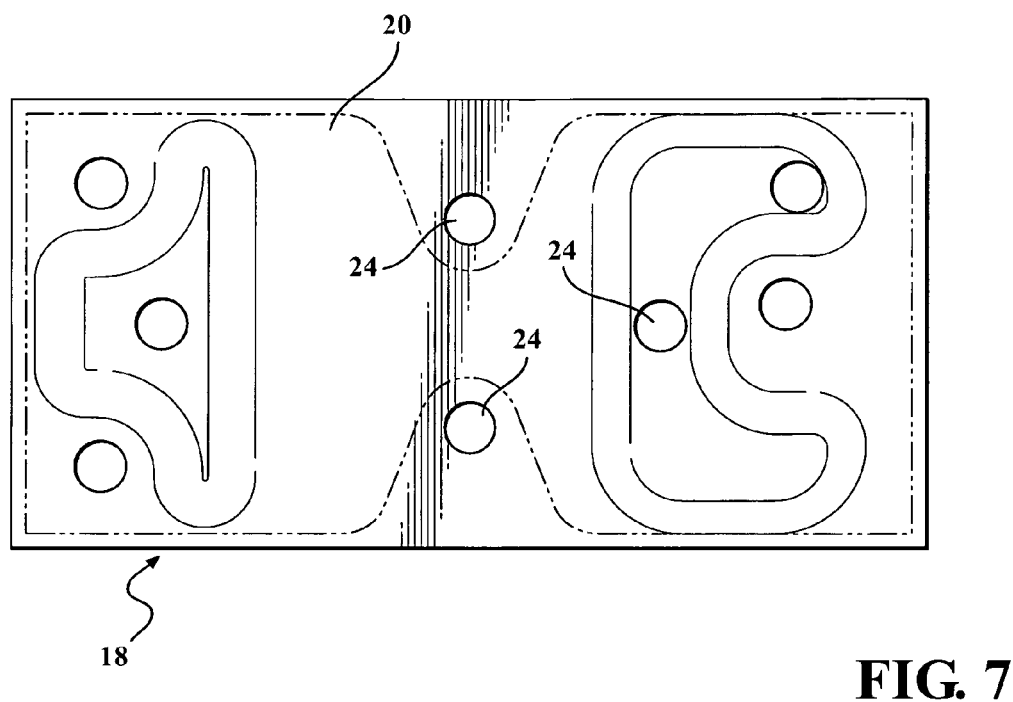
FIG. 7 is a front view of a vehicle attachment plate used as part of a bumper beam having an integrated energy absorber, according to the present invention.
Figure 8:
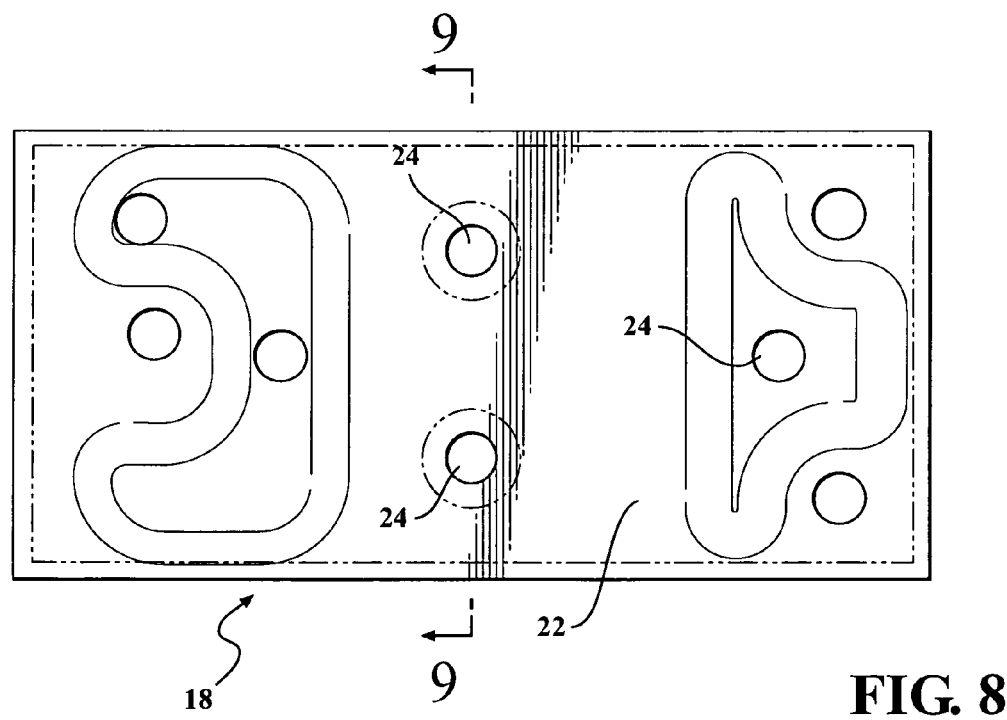
FIG. 8 is a rear view of a vehicle attachment plate used as part of a bumper beam having an integrated energy absorber, according to the present invention.
Figure 9:
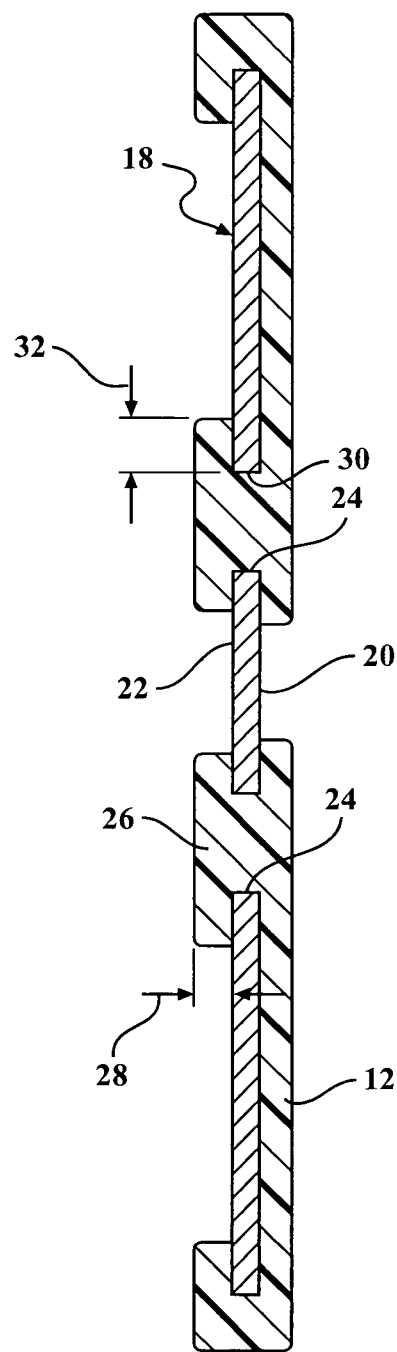
FIG. 9 is a sectional view taken along lines 9-9 of FIG. 8.

The steel brackets 18 each have a front side 20 which mounts to the vehicle rails (not shown) and a rear side 22 which faces the fascia (also not shown). As mentioned above, the steel brackets 18 are overmolded into the beam cover plate 12, as shown by the shaded areas in FIGS. 7 and 8. Referring to FIG. 9, a sectional view along the side of one of the brackets 18 is shown. The brackets 18 have several apertures 24, and a portion of the overmolded material 26 which makes up the beam cover plate 12 flows through two of the apertures 24 during the overmolding process. The overmold material 26 has a thickness 28 of about five millimeters and extends beyond the edge 30 of each aperture 24 a distance 32 of about five millimeters. The remaining apertures 24 are used for connecting the brackets 18 to the vehicle rails.

Figure 3:
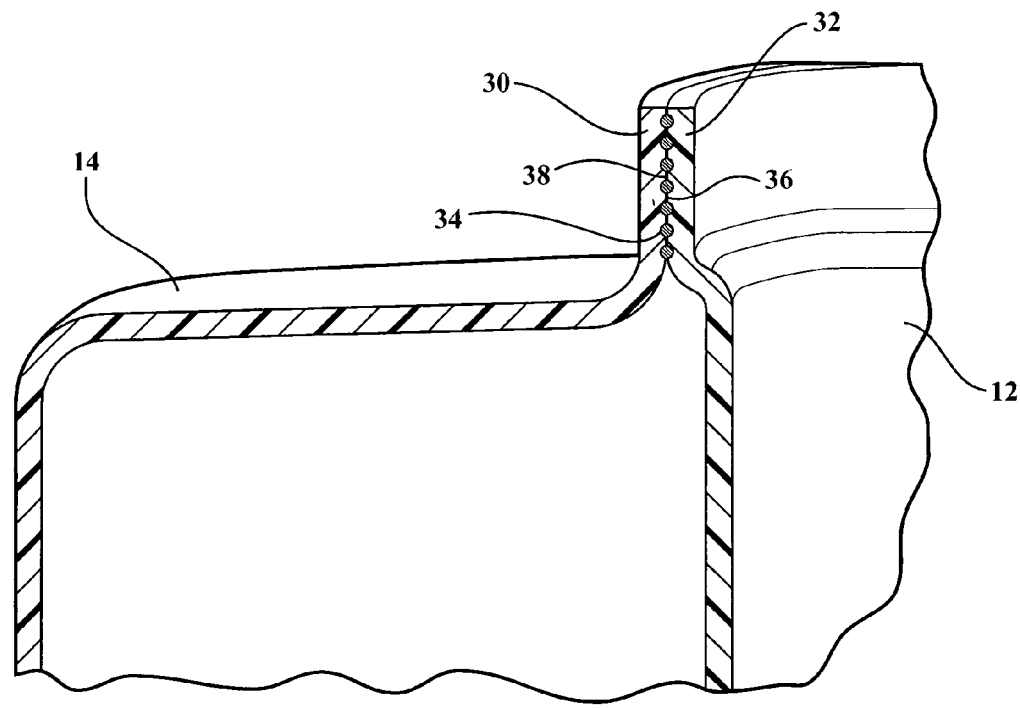
FIG. 3 is an enlarged sectional side view of section 3-3 in FIG. 1.

As mentioned above, the cover plate 12 and the beam structural member 14 are connected by RIW. Referring to FIG. 3, an enlarged sectional view of the cover plate 12 and beam structural member 14 are shown. The cover plate 12 has a first welding flange 30 and the beam structural member 14 has a second welding flange 32. The first welding flange 30 substantially circumscribes the cover plate 12, and the second welding flange 32 substantially circumscribes the beam structural member 14.

Disposed between each of the flanges 30,32 is an implant 34. To connect the cover plate 12 and the beam structural member 14, the cover plate 12 is positioned relative to the beam structural member 14 such that the first welding flange 30 contacts the second welding flange 32, and the implant 34 is located in between. A current is applied to the implant 34, heating the implant 34, thereby melting a first melt surface 36 of the first welding flange 30 and a second melt surface 38 of the second welding flange 32. Melting the surfaces allows for some of the material of each melt surface 36,38 to flow across the implant 34. Once the current is no longer applied to the implant 34, the implant 34 and melt surfaces 36,38 cool, and the first welding flange 30 and second welding flange 32 become interconnected together. When connected, the beam structural member 14 and the cover plate 12 form a closed section, or structural "box" section.

While the implant 34 shown in FIG. 3 is a wire mesh made of stainless steel, it is within the scope of the invention that the implant 34 may be of other shapes and made from other materials, such as copper, aluminum, brass, nickel, and titanium.

Figure 4:
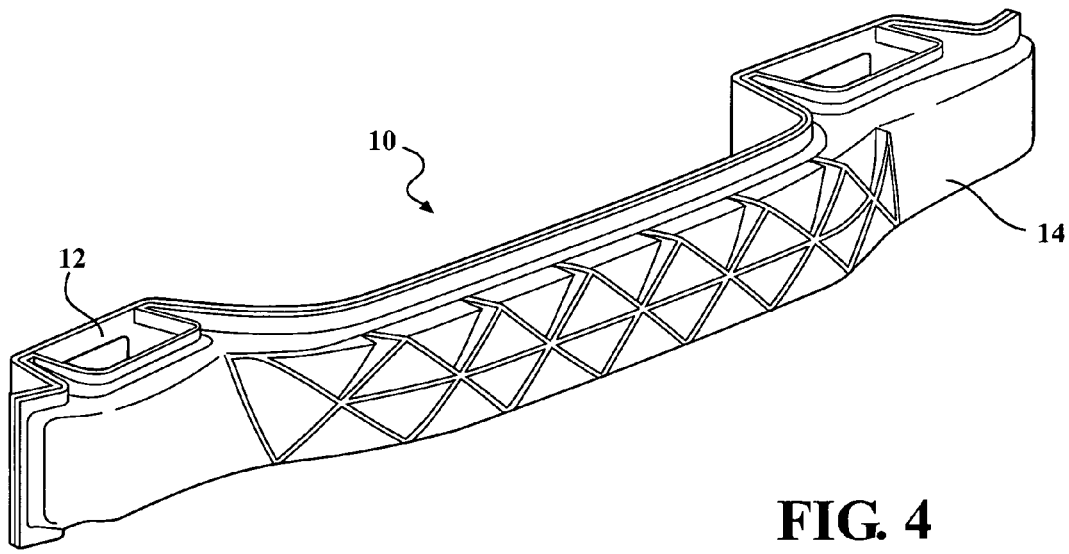
FIG. 4 is a second perspective view of a bumper beam having an integrated energy absorber, according to the present invention.
Figure 5:
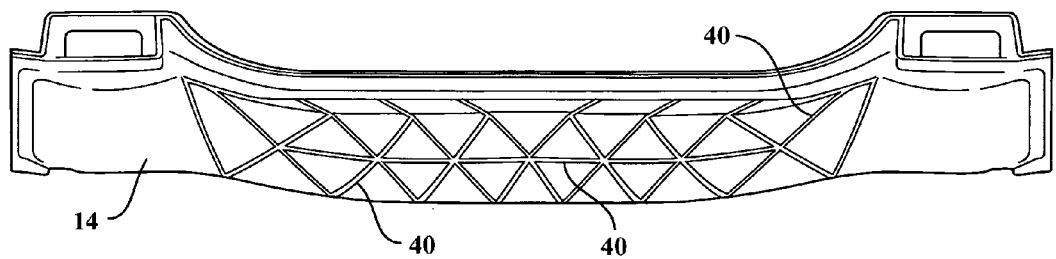
FIG. 5 is a front view of a beam structural member used as part of a bumper beam having an integrated energy absorber, according to the present invention.
Figure 6:
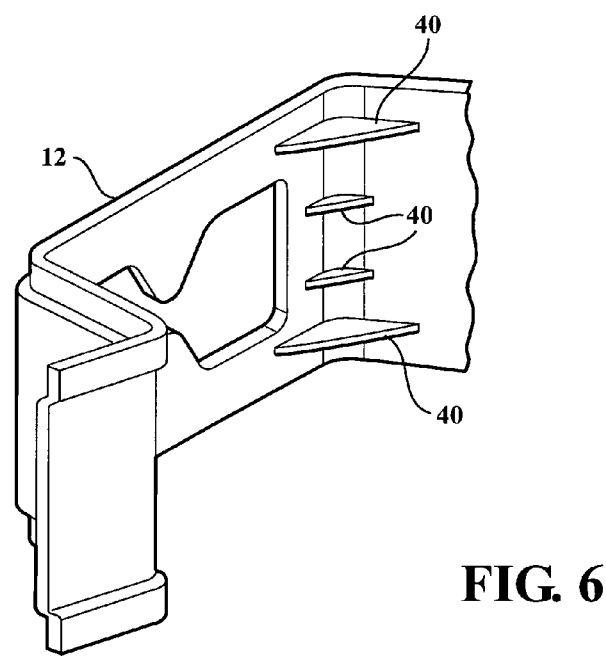
FIG. 6 is an enlarged perspective view of a beam cover plate used as part of a bumper beam having an integrated energy absorber, according to the present invention.

Referring to FIGS. 4-6, the cover plate 12 and the beam structural member 14 have a plurality of ribs 40 which are used for improving the strength of the cover plate 12 and the beam structural member 14. While it has been shown in FIGS. 4-6 that the ribs 40 connected to the cover plate 12 are oriented horizontally, and the ribs 40 connected to the beam structural member 14 are diagonal, it is within the scope of the invention that the ribs 40 on both the cover plate 12 and the beam structural member 14 may be formed of different shapes and orientations, depending on how the cover plate 12 and beam structural member 14 are to be reinforced.

The bumper beam 10 of the present invention incorporates the novel features of the structural member 14 and energy absorber 16 connected and functioning as a single part when connected to a vehicle, with the energy absorber 16 functioning to absorb energy in a collision. Additionally, the structural member 14 and energy absorber 16 are connected through the use of RIW to form an enclosed section tubular structure, which improves efficiency and reduces cost of manufacturing.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An energy absorbing component externally mounted to a vehicle, comprising:
   a beam structural member operable for attachment to a vehicle;
   a beam cover plate connected to said beam structural member through resistive implant welding to form a closed section; and
   at least one energy absorber operably connected to said beam structural member such that said at least one energy absorber absorbs energy when said vehicle undergoes a collision.

2. The energy absorbing component incorporated into an external component of a vehicle of claim 1, further comprising:
   a first welding flange formed as part of said beam cover plate;
   a second welding flange formed as part of beam structural member; and
   an implant disposed between said first welding flange and said second welding flange such that when said implant is heated, at least a portion of said first welding flange and a portion of said second welding flange melt, and when said implant is no longer heated, said implant cools, and said first welding flange integrally molds with said second welding flange, connecting said beam cover plate to said beam structural member.

3. The energy absorbing component incorporated into an external component of a vehicle of claim 1, wherein said beam cover plate is made from injection molded long glass fiber nylon material.

4. The energy absorbing component incorporated into an external component of a vehicle of claim 1, further comprising at least one vehicle attachment plate overmolded to said beam cover plate, said vehicle attachment plate operable for connection with a vehicle.

5. The energy absorbing component incorporated into an external component of a vehicle of claim 4, said at least one vehicle attachment plate further comprising a plurality of apertures, wherein a portion of an overmold material used for creating said beam cover plate extends through one or more of said plurality of apertures as said at least one vehicle attachment plate is overmolded to said beam cover plate.

6. The energy absorbing component incorporated into an external component of a vehicle of claim 1, wherein said beam structural member is made from injection molded long glass fiber nylon material.

7. The energy absorbing component incorporated into an external component of a vehicle of claim 1, wherein said at least one energy absorber is made from expanded polypropylene using a steam injection molding process.

8. The energy absorbing component incorporated into an external component of a vehicle of claim 1, further comprising a plurality of ribs, a portion of said plurality of ribs being formed as part of said beam cover plate, and a portion of said plurality of ribs being formed as part of said beam structural member.

9. A method for creating a component for absorbing energy during a collision, comprising the steps of:
   providing a beam structural member;
   providing at least one energy absorber;
   providing a beam cover plate;
   providing at least one vehicle attachment plate operable for connection with a vehicle;
   connecting said beam cover plate to said beam structural member through resistive implant welding;
   overmolding said at least one vehicle attachment plate to said beam cover plate;
   connecting said at least one energy absorber to said beam structural member such that said at least one energy absorber absorbs energy when said vehicle undergoes a collision.

10. The method for creating a component for absorbing energy during a collision of claim 9, further comprising the steps of creating said beam cover plate from injection molded long glass fiber nylon material.

11. The method for creating a component for absorbing energy during a collision of claim 9, further comprising the steps of creating said beam structural member from injection molded long glass fiber nylon material.

12. The method for creating a component for absorbing energy during a collision of claim 9, further comprising the steps of creating said at least one energy absorber from expanded polypropylene using a steam injection molding process.

13. The method for creating a component for absorbing energy during a collision of claim 9, further comprising the steps of forming a closed box section when said beam cover plate is connected to said beam structural member.

14. The method for creating a component for absorbing energy during a collision of claim 9, further comprising the steps of:
   providing a first welding flange formed as part of said beam cover plate;
   providing a second welding flange formed as part of said beam structural member;
   providing an implant disposed between said first welding flange and said second welding flange;
   melting at least a portion of said first welding flange and a portion of said second welding flange by applying a current to and heating said implant; and
   integrally molding said first welding flange with said second welding flange by cooling said implant by removing said current from said implant, connecting said beam cover plate to said beam structural member.

15. The method for creating a component for absorbing energy during a collision of claim 9, further comprising the steps of:
   providing a plurality of apertures formed as part of said vehicle attachment plate; and
   extending at least a portion of an overmold material used for creating said beam cover plate through one or more of said plurality of apertures as said at least one vehicle attachment plate is overmolded to said beam cover plate.

16. The method for creating a component for absorbing energy during a collision of claim 9, further comprising the steps of:
   providing a plurality of ribs;
   forming a portion of said plurality of ribs as part of said beam cover plate; and
   forming a portion of said plurality of ribs as part of said beam structural member.

17. An energy absorbing component externally mounted to a vehicle, comprising:
   a beam structural member;
   at least one energy absorber;
   a beam cover plate connected to said beam structural member through resistive implant welding; and
   at least one vehicle attachment plate connected to a vehicle, said at least one vehicle attachment plate overmolded to said beam cover plate.

18. The energy absorbing component externally mounted to a vehicle of claim 17, wherein said beam cover plate is made from injection molded long glass fiber nylon material.

19. The energy absorbing component externally mounted to a vehicle of claim 17, wherein said beam cover plate and said beam structural member formed as closed box section when said beam cover plate is connected to said beam structural member.

20. The energy absorbing component externally mounted to a vehicle of claim 17, said at least one vehicle attachment plate further comprising a plurality of apertures, wherein a portion of an overmold material used for creating said beam cover plate extends through one or more of said plurality of apertures as said at least one vehicle attachment plate is overmolded to said beam cover plate.

21. The energy absorbing component incorporated into an external component of a vehicle of claim 17, further comprising:
   a first welding flange formed as part of said beam cover plate;
   a second welding flange formed as part of beam structural member; and
   an implant disposed between said first welding flange and said second welding flange such that when said implant is heated, at least a portion of said first welding flange and a portion of said second welding flange melt, and when said implant is no longer heated, said implant cools, and said first welding flange integrally molds with said second welding flange, connecting said beam cover plate to said beam structural member.

22. The energy absorbing component incorporated into an external component of a vehicle of claim 17, further comprising a plurality of ribs, a portion of said plurality of ribs being formed as part of said beam cover plate, and a portion of said plurality of ribs formed as part of said beam structural member.

23. The energy absorbing component externally mounted to a vehicle of claim 17, wherein said beam structural member is made from injection molded long glass fiber nylon material.

24. The energy absorbing component externally mounted to a vehicle of claim 17, wherein said at least one energy absorber is made from expanded polypropylene using a steam injection molding process.

25. An energy absorbing component externally mounted to a vehicle, comprising:
   a beam structural member operable for attachment to a vehicle;
   a beam cover plate connected to said beam structural to form a closed section, at least one vehicle attachment plate overmolded to said beam cover plate, said vehicle attachment plate operable for connection with a vehicle; and
   at least one energy absorber operably connected to said beam structural member such that said at least one energy absorber absorbs energy when said vehicle undergoes a collision.

26. An energy absorbing component externally mounted to a vehicle, comprising:
   a beam structural member operable for attachment to a vehicle;
   a beam cover plate made from and injection molded long glass fiber material connected to said beam structural member through resistive implant welding to form a closed section, and
   at least one energy absorber operably connected to said beam structural member such that said at least one energy absorber absorbs energy when said vehicle undergoes a collision.

27. An energy absorbing component externally mounted to a vehicle, comprising:
   a beam structural member operable for attachment to a vehicle;
   a beam cover plate made to form a closed section,
   a plurality of ribs, a portion of said plurality of ribs being formed as part of said beam cover plate, and a portion of said plurality of ribs being formed as part of said beam structural member, and
   at least one energy absorber operably connected to said beam structural member such that said at least one energy absorber absorbs energy when said vehicle undergoes a collision.

* * * * *

UNITED STATES PATENT AND TRADEMARK OFFICE
CERTIFICATE OF CORRECTION

| | | |
|---|---|---|
| PATENT NO. | : 8,439,411 B2 | Page 1 of 1 |
| APPLICATION NO. | : 13/066134 | |
| DATED | : May 14, 2013 | |
| INVENTOR(S) | : Cave et al. | |

It is certified that error appears in the above-identified patent and that said Letters Patent is hereby corrected as shown below:

In the Specification

Column 2,
Line 5, insert a -- ; -- after -- invention --.

In the Claims

Column 6,
Line 32, insert -- member -- after -- structural --.

Column 6,
Line 46, delete "and" after -- injection --.

Column 6,
Line 49, insert a -- ; -- after -- section --.

Column 6,
Line 57, insert a -- ; -- after -- section --.

Column 6,
Line 62, insert a -- ; -- after -- member --.

Signed and Sealed this
First Day of July, 2014

Michelle K. Lee
*Deputy Director of the United States Patent and Trademark Office*